United States Patent Office 3,641,137
Patented Feb. 8, 1972

3,641,137
PREPARATION OF METHACRYLIC ACID
Donald M. Fenton, Anaheim, Calif., assignor to Union
Oil Company of California, Los Angeles, Calif.
No Drawing. Filed Feb. 19, 1969, Ser. No. 800,744
Int. Cl. C07c 53/28, 57/04
U.S. Cl. 260—526 N                         12 Claims

ABSTRACT OF THE DISCLOSURE

Acetylenic hydrocarbons are hydrocarboxylated by contact with carbon monoxide and a carboxylic acid in the presence of a catalyst comprising a complex of a Group VIII noble metal and a biphyllic ligand under liquid phase reaction conditions at temperatures between 50° C. and 400° C. and at pressures sufficient to maintain liquid phase. The product anhydrides are readily hydrolyzed to unsaturated acids which are useful as polymerizable monomers.

---

The invention relates to the preparation of unsaturated anhydrides and acids and, in particular, relates to a method of preparing methacrylic acid in high yields from the hydrocarboxylation of propyne.

Methods of preparing unsaturated anhydrides and acids are known in the art, however, the methods are generally complicated, expensive and inefficient, often involving several reactions and intermediate products or requiring the use of oxidative or corrosive environments. For example, methacrylic acid is now prepared by the relatively expensive method of reacting acetone with hydrogen cyanide to form acetone cyanohydrin which is then hydrolyzed to methacrylic acid with sulfuric acid.

The object of the invention, therefore, is to provide an efficient method of preparing unsaturated anhydrides and/or acids.

Another object is to provide a process for producing methacrylic acid in high yields.

The reaction of the invention proceeds as follows:

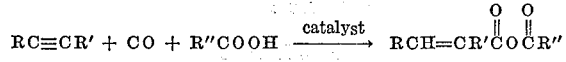

The anhydride may be readily hydrolyzed to yield the unsaturated acid (e.g., RCH=CR'COOH) and the reactant acid (e.g., R"COOH) which may be recycled to the hydrocarboxylation reactor.

The acetylenic hydrocarbon useful in the invention can have the general formula:

wherein R and R' are hydrogen or the same or different alkyl group having 1 to about 8 carbons, e.g., methyl, ethyl, propyl, butyl, pentyl, hexyl, heptyl and octyl, and preferably R' is hydrogen (i.e., hydrocarbon with an alpha acetylenic bond). Examples of suitable acetylenic hydrocarbons are acetylene, propyne, 1-butyne, 2-butyne, 1-pentyne, 2-pentyne, 3-methyl-1-butyne, 1-hexyne, 2-hexyne, 3-hexyne, 3 methyl-1- pentyne, 4 methyl-1-pentyne, 4 methyl-2-pentyne, 1-heptyne, 3-heptyne, 3 methyl-1-hexyne, 5 methyl-1-hexyne, 1-octyne, 4 octyne, 5 methyl-3-heptyne, 4 propyl-2-pentyne, 1-nonyne, 4-nonyne, 5 methyl-3-octyne, 3 isobutyl-1-pentyne, 2 butyl-3-hexyne, 3-decyne, 4-dodecyne, 2 pentyl-3-octyne, 9-octadecyne, etc.

Propyne is a preferred compound since when propyne is reacted with carbon monoxide and a carboxylic acid an anhydride is produced, which when subsequently hydrolyzed, gives the highly reactive and valuable methacrylic acid in high yields.

The reactant carboxylic acid may be in general any organic acid having the formula:

wherein R is hydrogen, alkyl, cycloalkyl, aryl, alkaryl or aralkyl; preferably R has 1 to about 18 carbons and most preferably R is alkyl having 1 to about 12 carbons, e.g., methyl, ethyl, propyl, hexyl, nonyl, etc. or is aryl with 6 to about 9 carbons e.g., phenyl, tolyl, etc.

Examples of useful acids are formic, acetic, propionic, n-butyric, isobutyric, pivalic, n-valeric, n-caproic, caprylic, capric, decanoic, lauric, myristic, palmitic, stearic, benzoic, phthalic, terephthalic, and toluic. The preferred acids are the fatty acids having 2 to about 12 carbons.

The catalyst of the invention comprises a Group VIII noble metal in complex with a biphyllic ligand. The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following structure:

wherein E is trivalent phosphorus, arsenic, antimony or bismuth; and
wherein R is the same or different alkyl, cycloalkyl, or aryl having at most about 18 carbons; examples of which are methyl, butyl, nonyl, cyclohexyl, cyclodecyl, phenyl, tolyl, xylyl, tetramethylphenyl, etc. Preferably at least one R is aryl e.g., phenyl, tolyl, xylyl, etc. having 6 to 9 carbons and, most preferably, the ligand is triaryl.

Examples of suitable biphyllic ligands having the aforementioned strutcure and useful in my invention to stabilize the catalyst composition are the following:

trimethylphosphine,
triethylarsine,
triethylbismuthine,
triisopropylstibine,
dioctylcycloheptylphosphine,
tricyclohexylphosphine,
ethyldiisopropylstibine,
tricyclohexylphosphine,
methyldiphenylphosphine,
methyldiphenylstibine,
triphenylphosphine,
triphenylbismuthine,
tri(o-tolyl)phosphine,
trixylylarsine,
phenyldiisopropylphosphine,
phenyldiamylphosphine,
ethyldiphenylphosphine,
phenylditolylphosphine,
xylyldiphenylarsine,
tolyldi(m-xylyl)stibine,
trixylylphosphine,
trixylylarsine,
trixylylstibine,
cyclopentyldixylylstibine,
dioctylphenylphosphine,
tridurylphosphine,
tricumenylphosphine, tripropylphenylphosphine,
triethylphenylphosphine,
trixylylbismuthine, etc.

Of the aforementioned, the aryl phosphines and particularly the triarylphosphines (e.g., triphenylphosphine) are preferred because of their greater activity.

The Group VIII noble metal may be ruthenium, rhodium, palladium, osmium, iridium, or platinum. A catalytic quantity of the metal is added (e.g., 0.002–2% of the reaction medium) and the metal may be added as a soluble salt, a carbonyl, a hydride or as a chelate.

The Group VIII metal may be complexed with the abovedescribed biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess (e.g. 10–300%) of that stoichiometrically required to form a complex with the Group VIII metal. The complex has from 1 to about 5 moles of biphyllic ligand per atom of the metal and other components such as hydride, or soluble anions such as sulfate, nitrate, $C_1$–$C_5$ carboxylates (e.g., acetate, propionate isobutyrate, valerate, etc.), halides, etc. may be but need not be included in the complex catalyst of this invention. These components may be incorporated in the catalyst by the formation of the catalyst complex from a Group VIII metal salt of the indicated anions.

Examples of suitable sources of the noble metals are as follows: iridium carbonyl chloride, iridium carbonyl hydride, iridium carbonyl, iridium tetrabromide, iridium tribromide, iridium trifluoride, iridium trichloride, osmium trichloride, chloroosmic acid, palladium hydride, palladous chloride, palladous cyanide, palladous iodide, osmium isopropionate, iridium valerate, palladium acetate, palladous nitrate, platinic acid, platinous iodide, palladium cyanide, sodium hexachloroplatinate, potassium trichloro(ethylene)platinate(II), chloropentaaminorhodium(III) chloride, rhodium dicarbonyl chloride dimer, rhodium nitrate, rhodium trichloride, rhodium carbonyl hydride, rhodium(1)chloride, ruthenium trichloride, tetraaminorutheniumhydroxychloro chloride, etc.

The reaction is performed under liquid phase conditions and generally but not necessarily in the presence of a liquid organic solvent (i.e., has a solvency for the reactants and the catalyst) inert to the reactants or to the reaction conditions. Suitable solvents include, for example, hydrocarbons, ketones, sulfoxides, amides, ethers, esters and acids. Examples of the foregoing are hexane, heptane, benzene, toluene, dimethylsulfoxide, decylmethylsulfoxide, dimethyl formamide, acetone, diethyl ketone, diisopropyl ketone, di-iso-propyl ether, di-n-butyl ether, ethylene glycol di-iso-butyl ether, methyl o-tolyl ether, triethylene glycol diethyl ether, ethyl formate, methyl acetate, n-propyl formate, glycol diformate, n-dibutyl phthalate, acetaic acid propionic acid, butyric acid, and toluic acid.

The preferred solvent is a fatty acid having at most about 25 carbons preferably at most about 12 carbons, such as acetic acid, propionic acid, butyric acid, pivalic ride, tetraaminorutheniumhydroxychloro chloride, etc. The reactant acid may serve as a solvent in which case the acid is supplied in excess of (e.g., 2 to 30 times) that required for the reaction.

The reaction is preferably conducted under anhydrous conditions, e.g., below 10% water and preferably below 3% water. As will be illustrated in the examples, improved yields are obtained where the reaction is carried out in the absence of water, which apparently reacts with the acetylenic compound to form a ketone. In addition, in the case where propyne is hydrocarboxylated, water is detrimental in that it decreases the ratio of methacrylic acid to crotonic acid formed. Superior results are obtained by first preparing the anhydride in an anhydrous environment and then hydrolyzing the anhydride to form the acid, especially in the case where methacrylic acid is prepared.

The hydrocarboxylation is performed at relatively mild reaction conditions, e.g., at temperatures from 50° C. to 400° C., preferably from 100° to 250° C. and at pressures from 50 to 2,000 p.s.i.g., preferably from 600 to 1,000 p.s.i.g., sufficient to maintain liquid phase reaction conditions.

The reaction may be performed batchwise or in a continuous fashion in more or less conventional manner. In the continuous process, the reactants are continuously fed to a reactor with the gaseous reactants and by-products withdrawn and recycled if desired. A liquid phase comprising the product anhydride, catalyst and solvent is withdrawn from the side or bottom of the reactor, the anhydride separated therefrom by distillation and hydrolyzed in a separate reactor in conventional manner. The unreacted acid and the catalyst and solvent are preferably recycled to the reactor. A by-product of the anhydride hydrolysis is an acid which has the same formula as the reactant acid. Hence, by-product acid from the hydrolysis may be recycled to the reactor for further utilization in the hydrocarbonylation.

The following examples will further illustrate the practice of the invention and demonstrate the results obtainable thereby:

EXAMPLE 1

To a ½ gallon autoclave were added 400 milliliters of acetic acid, 1 gram of palladium chloride, 6 grams of triphenylphosphine and 48 grams of propyne. The autoclave was pressured with carbon monoxide to 800 p.s.i.g. and the mixture was stirred and heated at 150° C. for about 2 hours. The autoclave was cooled, depressured and opened and the contents removed. The product mixture was hydrolyzed by the addition of water. The products of the hydrolysis were analyzed by gas chromatography to reveal that 17 grams of methacrylic acid and 1 gram of crotonic acid were formed.

When 1-heptyne is substituted for propyne in the above experiment, an unsaturated acid is obtainable.

When acetylene is substituted for propyne in the above experiment, a mixed acrylic and acetic, anhydride is formed, which when hydrolyzed yields acrylic and acetic acids.

When the reaction is repeated with the substitution of 1 gram of iridium acetate for the palladium chloride, a similar carboxylation occurs.

EXAMPLE 2

To a ½ gallon autoclave were added 400 milliliters of acetic acid, 1 gram of palladium chloride, 6 grams of triphenylphosphine, 46 grams of propyne and 15 milliliters of water. The mixture was stirred and heated at 175° C. for 24 hours. The autoclave was cooled, depressured and opened and the contents removed. The product mixture was analyzed by gas chromatography to reveal that 0.5 gram of methacrylic acid, 0.6 gram of crotonic acid, 0.5 gram of isopropenyl acetate and 2 grams of acetone were formed.

The invention is not to be limited to the specific modes practiced by the following examples but by the methods set forth in the following claims and their equivalents.

I claim:

1. A hydrocarboxylation process comprising contacting an acetylenic hydrocarbon having the general formula:

wherein R and R' are hydrogen or the same or different alkyl group having 1 to about 8 carbons with carbon monoxide and a carboxylic acid having 2 to about 19 carbons in the presence of a complex of palladium and a biphyllic ligand having the formula:

wherein E is trivalent phosphorus, arsenic, antimony or bismuth; and wherein R is the same or different alkyl, cycloalkyl or aryl having 1 to about 18 carbons, at reaction conditions including a temperature between about 50° C. and 400° C. and at a pressure sufficient to maintain liquid phase reaction conditions, sufficient to form an anhydride of an unsaturated carboxylic acid having one more carbon than said acetylenic compound.

2. The process of claim 1 wherein the biphyllic ligand is a triarylphosphine.

3. The process of claim 2 wherein the acetylenic compound is acetylene.

4. The process of claim 2 wherein the carboxylic acid is a fatty acid having 2 to about 12 carbons.

5. The process of claim 1 wherein the product anhydride from the hydrocarboxylation is hydrolyzed to form an unsaturated acid.

6. The process of claim 1 wherein the reaction is performed under entirely anhydrous conditions.

7. A hydrocarboxylation process comprising contacting propyne with carbon monoxide and a fatty acid having 2 to about 12 carbons under anhydrous conditions, in the presence of a complex of palladium and a triarylphosphine whose aryl groups have 6 to about 9 carbons at reaction conditions comprising a temperature between about 100° C. and 250° C. and a pressure sufficient to maintain liquid phase conditions, and sufficient to form an anhydride of methacrylic acid and said fatty acid as the major product of said process.

8. The process of claim 7 wherein the triarylphosphine is triphenylphosphine.

9. The process of claim 7 wherein the product anhydride is subsequently hydrolyzed to yield an unsaturated acid.

10. The process of claim 9 wherein the triarylphosphine is triphenylphosphine, and wherein the fatty acid is acetic acid.

11. The process of claim 2 wherein the triarylphosphine is triphenylphosphine.

12. The process of claim 1 wherein said acetylenic hydrocarbon is propyne.

References Cited

UNITED STATES PATENTS

| | | | |
|---|---|---|---|
| 2,809,976 | 10/1957 | Reppe et al. | 260—533 |
| 2,886,591 | 5/1959 | Lautenschlager et al. | 260—533 X |
| 3,168,553 | 2/1965 | Slaugh | 260—546 X |
| 3,437,676 | 4/1969 | Kutepow et al. | 260—533 A X |
| 3,501,518 | 3/1970 | Kutepow et al. | 260—533 A X |

LORRAINE A. WEINBERGER, Primary Examiner

R. D. KELLY, Assistant Examiner

U.S. Cl. X.R.

260—398, 413, 546